US006252153B1

(12) United States Patent
Toyama

(10) Patent No.: US 6,252,153 B1
(45) Date of Patent: Jun. 26, 2001

(54) SONG ACCOMPANIMENT SYSTEM

(75) Inventor: Motoki Toyama, Kobe (JP)

(73) Assignee: Konami Corporation, Tokyo-to (JP)

(*) Notice: Subject to any disclaimer, the term of this patent is extended or adjusted under 35 U.S.C. 154(b) by 0 days.

(21) Appl. No.: 09/649,502

(22) Filed: Aug. 28, 2000

(30) Foreign Application Priority Data

Sep. 3, 1999 (JP) ..... 11-250903

(51) Int. Cl.[7] ..... G09B 5/00; G09B 15/02; G10H 1/36

(52) U.S. Cl. ..... 84/634; 84/645; 84/477 R; 84/DIG. 6; 434/307 A

(58) Field of Search ..... 84/609–634, 645, 84/477 R, 478, DIG. 6; 434/307 A

(56) References Cited

U.S. PATENT DOCUMENTS 5,270,475 12/1993 Weiss et al. .
5,393,926 2/1995 Johnson .
5,488,196 1/1996 Zimmerman et al. .
5,491,297 2/1996 Johnson et al. .
5,670,729 9/1997 Miller et al. .
5,723,802 3/1998 Johnson et al. .
5,773,744 6/1998 Nagata .
5,804,752 9/1998 Sone et al. .
5,817,965 10/1998 Matsumoto .
5,925,843 7/1999 Miller et al. .

*Primary Examiner*—Stanley J. Witkowski
(74) *Attorney, Agent, or Firm*—Jordan and Hamburg LLP

(57) ABSTRACT

A song accompaniment system includes a karaoke machine and a simulated guitar machine, and the karaoke machine downloads accompanying music in the form of MIDI data from a source data storage. Of the MIDI data downloaded from the source data storage, a simulative instrument part of the accompanying music is transferred to the simulated guitar machine. In the simulated guitar machine, an allocation processor allocates individual sounds of the simulative instrument part to three scroll bars in a guidance picture which is presented on a monitor of the simulated guitar machine, and operating timing for producing the individual sounds is indicated by note marks which are scrolled along the scroll bars. When a player plays a simulated guitar, tone waveforms contained in the MIDI data received from the source data storage are modulated and an audio signal thus generated is output from speakers. If the simulated guitar is correctly operated, the accompanying music is reproduced in proper fashion.

17 Claims, 6 Drawing Sheets

SONG ACCOMPANIMENT SYSTEM

BACKGROUND OF THE INVENTION

This invention relates to a song accompaniment system comprising a singing support apparatus, or a so-called karaoke machine, and an instrumental accompaniment apparatus which makes use of one or more simulative instruments.

Various kinds of music game machines have conventionally been proposed and many of them have actually been used. In one known example of a music game machine, a set of note marks is scrolled toward a timing line on a monitor screen and, if an operating part of a simulative instrument is operated when a note mark matches the timing line, a musical sound corresponding to the note mark that has matched is output. In another known example of a music game machine, a plurality of buttons simulating those of multiple keyboards are provided just below a monitor and a set of note marks is scrolled to indicate the timing of playing each keyboard so that proper musical sounds can be output.

On the other hand, Japanese Unexamined Patent Publication No. 8-510849 proposes an imaginary musical instrument, in which a pulse waveform of sound of a simulated guitar resembling an electrocardiogram is displayed in a stationary fashion on a monitor screen and a timing line is moved at a constant speed in the direction of a time axis to thereby indicate operating timing of the simulated guitar. According to the Patent Publication, it is possible to reproduce a musical performance with this simulated guitar using performance information conforming to the Musical Instrument Digital Interface (MIDI) format.

The aforementioned conventional music game machines indicate operating timing as guidance for performing a readily available music and output musical sounds when one of the simulative instruments is operated with proper timing according to the indicated guidance. Accordingly, a player is just allowed to enjoy playing the simulative instruments. The conventional music game machines lack the ability to offer versatile ways of enjoying music, and would give only limited fun to the player. Another problem of the conventional music game machines is that it is necessary to prepare or program many pieces of music to be played and preparation of these music pieces is highly labor-intensive and time-consuming.

SUMMARY OF THE INVENTION

It is an object of the present invention to provide a song accompaniment system which is free from the problems residing in the prior art.

It is another object of the present invention to provide a song accompaniment system which can offer versatile ways of enjoying music to a player by enabling the player to play part of instrumental accompaniment using a simulative instrument for so-called karaoke song.

According to an aspect of the invention, a song accompaniment system comprises a singing support apparatus including a first sound output device which outputs accompanying music played by a plurality of musical instruments with a capability to mix and output vocal sounds entered from a microphone with the accompanying music; and an instrumental accompaniment apparatus including a simulative instrument having a timing indicating operation device, a first monitor which presents on-screen guidance indicating operating timing of the simulative instrument for playing a simulative instrument part of the accompanying music selectively taken in from the singing support apparatus, and a second sound output device which outputs sounds of the simulative instrument part when the instrumental accompaniment apparatus senses that the timing indicating operation device is operated in accordance with the on-screen guidance. The singing support apparatus stores the simulative instrument part of the accompanying music and remaining part of the accompanying music, and delivers the accompanying music excluding the simulative instrument part to the first sound output device.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Figure 1:
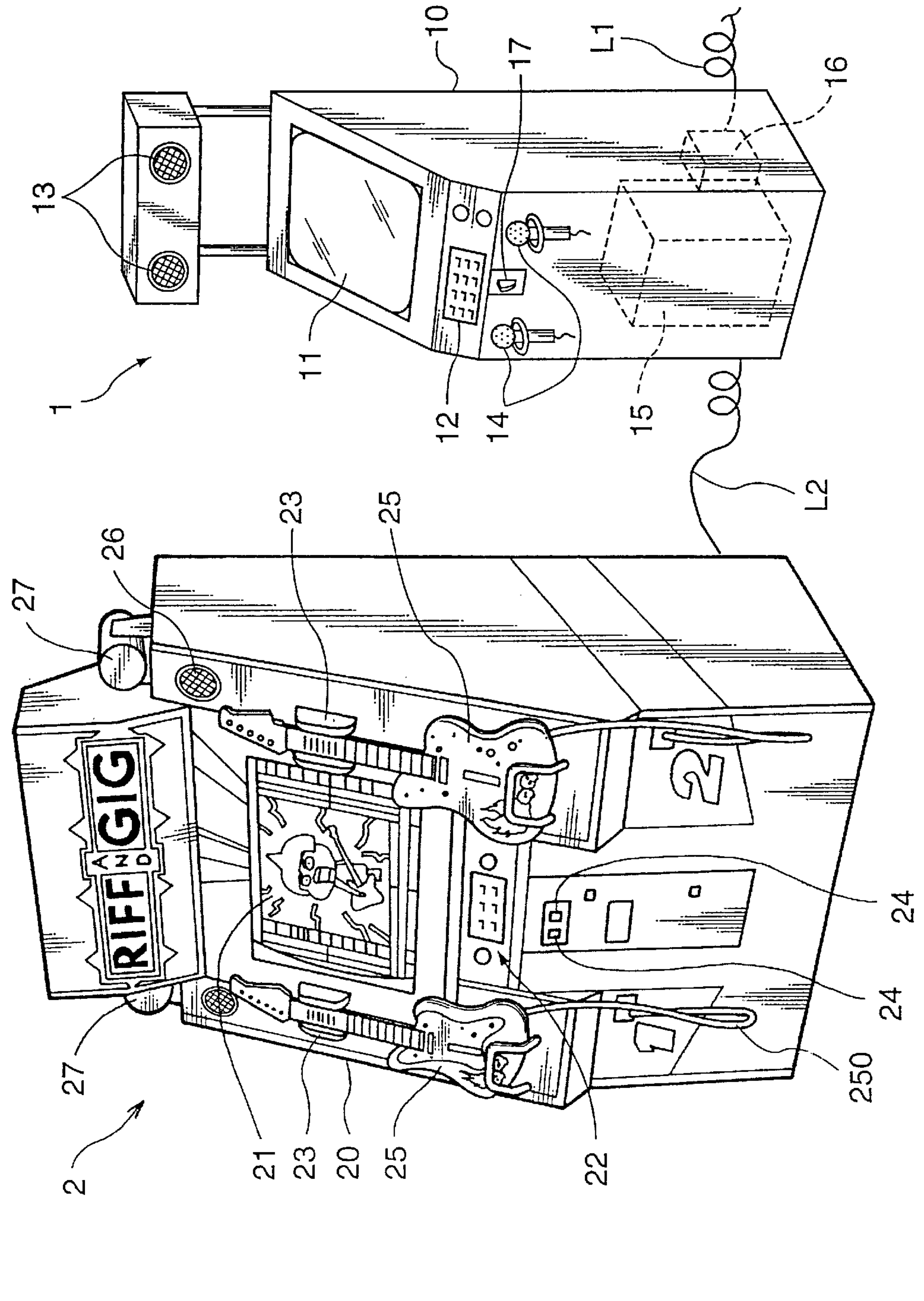
FIG. 1 is a perspective diagram showing an external appearance of a song accompaniment system according to an embodiment of the invention.

FIG. 1 is a perspective diagram showing an external appearance of a song accompaniment system according to a preferred embodiment of the invention. As shown in FIG. 1, the song accompaniment system is constructed mainly of a singing support apparatus (karaoke machine) 1 and an instrumental accompaniment apparatus (simulated guitar machine) 2. The singing support apparatus 1 comprises a televisionlike monitor 11 provided in an upper part of a console 10 for presenting pictures and an operating panel 12 provided immediately below the monitor 11, the operating panel 12 including music select buttons 121 (e.g., numeric keys) for selecting music pieces, a start button 122 for entering a command for starting music performance and other facilities for entering various commands such as cancellation. The singing support apparatus 1 is also provided with speakers 13 mounted above the console 10 at a position higher than the height of ordinary users. Further, two microphones 14 (for duet performance) which transmit sound data by means of remote control are hooked on retainers at the front of the console 10 and a receiving antenna (not shown) for receiving the sound data transmitted from the microphones 14 is at an appropriate position of the console 10. The microphones 14, however, are not limited to a radio remote-control type but may be of a type that is connected to the console 10 by cables.

The console 10 incorporates in its internal space a karaoke processor 15 which performs various processing and control operations for operating the karaoke machine 1, a communications modem unit 16 which receives music data from a server (source data storage 3) via a communications line L1. Since MIDI data is used as the music data in this embodiment, the communications modem unit 16 incorporates a MIDI interface. The karaoke machine 1 is connected to the simulated guitar machine 2 via a communications line L2 for data exchange between them. There is provided a coin slot 17 in a front central part of the karaoke machine 1.

An upper front part of a console 20 of the simulated guitar machine 2 forms a slant surface of a small angle of inclination and a monitor 21 for presenting pictures is built in a central part of this slant surface. There is provided an operating panel 22 including a start button and various operating buttons for selecting music pieces, for example, at the front of the console 20 below the operating panel 22, and left and right coin slots 24 are provided just below the operating panel 22. Further, the console 20 is equipped with a pair of simulated guitars 25 imitating the shape of actual guitars. The simulated guitars 25 provided as simulative instruments can be hooked on brackets 23 on the console 20 when not in use with the individual simulated guitars 25 connected to left and right parts of the console 20 by respective signal cables 250 which serve also for theft protection. Speakers 26 for generating performed musical sound are provided at upper left and right parts or other appropriate parts of the console 20 and lamps 27 for creating some spectacular effects by lighting are provided above the speakers 26.

With the provision of the two simulated guitars 25, the song accompaniment system of this embodiment allows the choice of one-player performance mode and two-player performance mode. The reason why two coin slots 24 are provided is to enable two players to perform simultaneously in the two-player performance mode.

Figure 2:
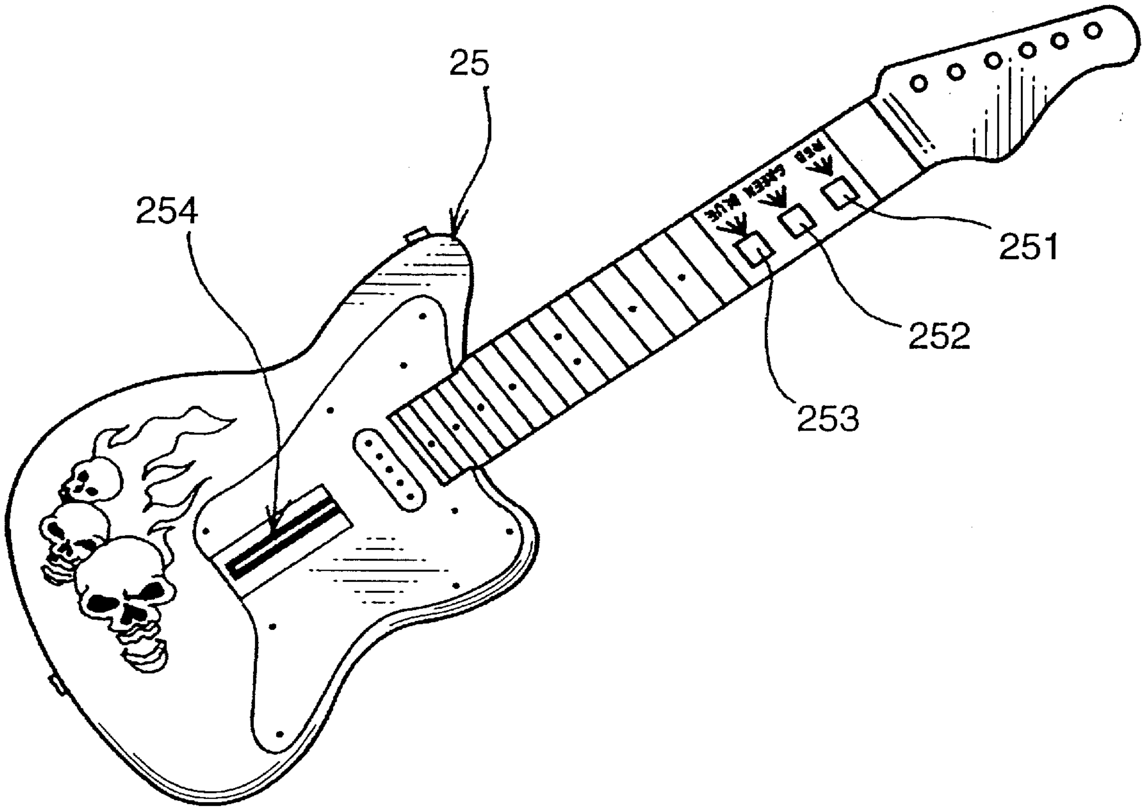
FIG. 2 is a diagram showing an external appearance of one of simulated guitars of FIG. 1.

FIG. 2 is a diagram showing the external appearance of one of the simulated guitars 25 shown in FIG. 1. Referring to FIG. 2, the simulated guitar 25 is provided with a specific number (three in this embodiment) of neck buttons 251–253 arranged at regular intervals along a longitudinal direction in a neck portion of the simulated guitar 25, as well as a picking operation device 254 approximately at the middle of a body portion. The neck buttons 251–253 are individually forced outward by unillustrated springs and sink inward by a specified amount when depressed. Mechanical push-button switches S1–S3 like microswitches are provided on the back of the neck buttons 251–253, respectively, inside the neck portion of the simulated guitar 25. The individual push-button switches S1–S3 outputs sensing signals when the respective neck buttons 251–253 are depressed.

The picking operation device 254 has a rocking member which protrudes from the surface of the body portion of the simulated guitar 25 by a specified amount. This rocking member is supported by a shaft which is parallel to both the surface of the body portion and the longitudinal direction of the neck portion. The rocking member is forced by a spring or other form of elastic member such that an operating part of the rocking member where a player performs picking action with fingers or a pick would be set in an upright position. The picking operation device 254 is constructed such that the operating part of the rocking member can incline as a result of the picking action of the player. The angle of inclination of the rocking member relative to the surface of the body portion is limited within its predetermined rocking range. The picking operation device 254 is associated with a rocking switch S4 which is formed of a photointerrupter including a light-emitting element and a light-sensing element. The photointerrupter detects a light-shielding member which moves together with the rocking member between the light-emitting element and the light-sensing element. The rocking switch S4 outputs a sensing signal when the rocking member is inclined by the picking action up to or beyond a specific angle.

Figure 3:
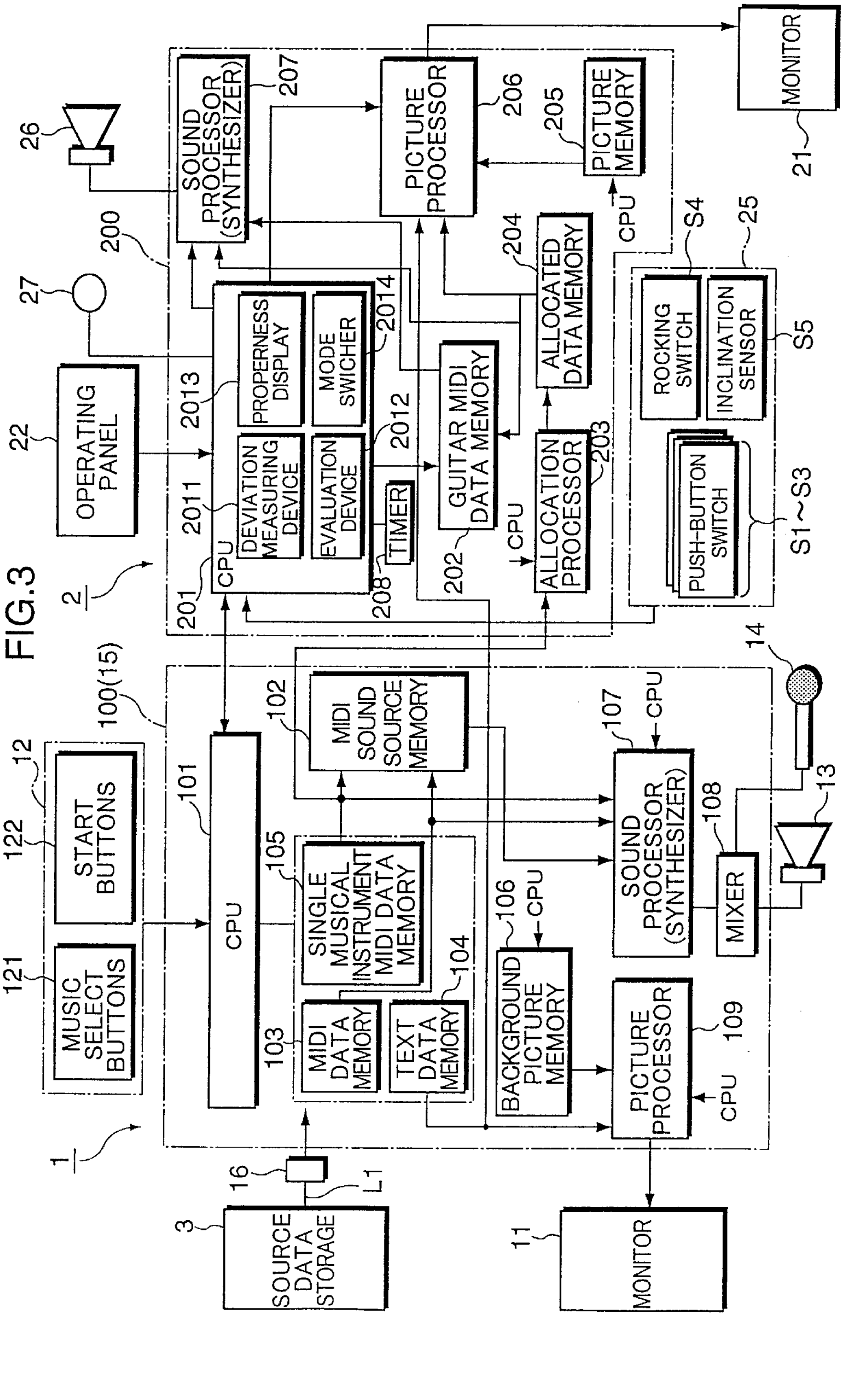
FIG. 3 is a block diagram of the song accompaniment system.

FIG. 3 is a block diagram of the song accompaniment system. As shown in FIG. 3, the song accompaniment system is configured mainly of the aforementioned source data storage 3 storing karaoke music pieces, a karaoke controller 100 housed in the karaoke processor 15 and a simulated guitar controller 200.

The source data storage 3 functions as a server which stores a large number of karaoke music pieces. The source data storage 3 has the ability to take in and store newly produced pieces of karaoke music. A piece of karaoke music is stored as a set of data including the title of the music piece (identified by a corresponding music number) and timing data. In this embodiment, the data set also includes performance information in the form of MIDI data (hereinafter referred to as music data), as well as the frequency, loudness, length and tone of sound at each point in time, wherein the tone is defined as the type of musical instrument identified by a musical instrument number. The data set further includes, as necessary, data on an introductory part, an intermediate part and a climatic part of the music piece. The source data storage 3 is provided with a data communications unit which is not illustrated. This data communications unit enables the source data storage 3 to transmit music data of a specific music number to the karaoke processor 15 via the communications line L1, the communications modem unit 16 and an associated transmission network according to a download request from the karaoke machine 1. As will be later described in detail, the karaoke controller 100 includes a MIDI data memory 103 which stores the music data for each music piece and a text data memory 104 which stores song texts and other data.

The karaoke controller 100 further includes a central processing unit (CPU) 101 which performs overall control of the operation of the karaoke machine 1 and a MIDI sound source memory 102 which stores MIDI sound sources. The MIDI sound source memory 102 can store basic tone waveforms of hundreds or more types of musical instruments, for instance, in relation to corresponding musical instrument numbers. In addition to the aforementioned MIDI data memory 103 a text data memory 104, the karaoke controller 100 also includes a simulative instrument MIDI data memory 105. In this embodiment, the simulative instrument MIDI data memory 105 stores music data concerning guitar tones in relation to individual music titles. The memories 103, 104 and 105 used in this embodiment have a storage capacity to store data on tens of thousands of music pieces.

A background picture memory 106 stores video pictures and animated pictures to be displayed as background on the monitor 11. Each of these pictures is stored in relation to one or more appropriate music pieces. A picture processor 109 reads out a picture related to a currently selected music piece and displays it on the monitor 11 with the text of the music piece superimposed on the picture. Presentation of the text is controlled such that it is displayed one measure after another in synchronism with the progress of performance, for example, using known technology.

A sound processor (synthesizer) 107 generates an audio signal by modulating tone waveforms specified by a musical instrument number in frequency, level and time using music data (data on frequency, strength and length of sounds). The audio signal thus generated is output from the speakers 13 through a mixer 108. The mixer 108 mixes voices of one or two players picked up by the microphone(s) 14 with the aforementioned audio signal which provides instrumental accompaniment, and outputs mixed sounds from the speakers 13. Although not specifically depicted in FIG. 3, the voices entered through the microphone(s) 14 are subjected to a specific echo effect operation (in which the waveform of an original voice signal is modulated in time) and a resultant audio signal is led to the mixer 108.

On the other hand, the simulated guitar controller 200 incorporates a CPU 201 which performs overall control of the operation of the simulated guitar machine 2. A guitar MIDI data memory 202 stores tone waveforms for the simulated guitars 25. While there are two simulated guitars 25 in the present embodiment, they can share a single MIDI sound source if guitars of the same type are simulated. If, however, different types of guitars are simulated, their music data are to be stored in the simulative instrument MIDI data memory 105 in relation to two musical instrument numbers in a manner shown in the foregoing description of the karaoke controller 100.

An allocation processor 203 takes in simulative instrument MIDI data of a selected music piece to be performed and allocates the data to three time axis lines corresponding to the individual neck buttons 251–253 in this embodiment, wherein the simulative instrument MIDI data is MIDI data stored in the simulative instrument MIDI data memory 105. More specifically, the allocation processor 203 properly allocates individual accompanying sounds to the three time axis lines based on individual timing data contained in the simulative instrument MIDI data for the selected music piece. For the purpose of this allocation, a specific number of allocation patterns are prepared beforehand and the accompanying sounds are sequentially allocated according to one of the allocation patterns.

To facilitate understanding of this allocation method, a specific allocation pattern is considered here, in which a group of five successive sounds are allocated to the three time axis lines which are designated A, B and C. In this allocation pattern, the first and second sounds are allocated to the line A, the third sound is allocated to the line C, and the fourth and fifth sounds are allocated to the line B, for example. When a plurality of allocation patterns are to be used, a sequence of using the allocation patterns should be predefined. If the music data downloaded from the source data storage 3 is associated with data concerning musical genres, it would be preferable to predefine a sequence of the allocation patterns used for each musical genre. In one extreme way, unique allocation patterns may be preset for individual music numbers. This alternative approach is preferable for improving the skill of performing instrumental accompaniment because the same allocation pattern is assigned to a given music piece.

If it is desired to give randomness, the allocation patterns may be selected in a random sequence. In this case, even when the same music piece is selected several times, different allocation patterns will be selected each time the music piece is selected, and this makes it less tedious to play the same music piece. In another alternative approach, the allocation processor 203 may be programmed such that specific allocation patterns are selected for different parts of a music piece, such as its introductory part, intermediate part and climatic part. In yet another alternative approach, allocation patterns with varying difficulties of performance may be prepared. If it is possible to select a plurality of music pieces at the beginning or to freely select music pieces during a specific time of period, for example, the allocation processor 203 may be programmed such that allocation patterns with increasing levels of difficulty are selected for the successively performed music pieces. The levels of difficulty may be set such that they become higher with an increasing frequency of the choice of allocation patterns.

Figure 4:
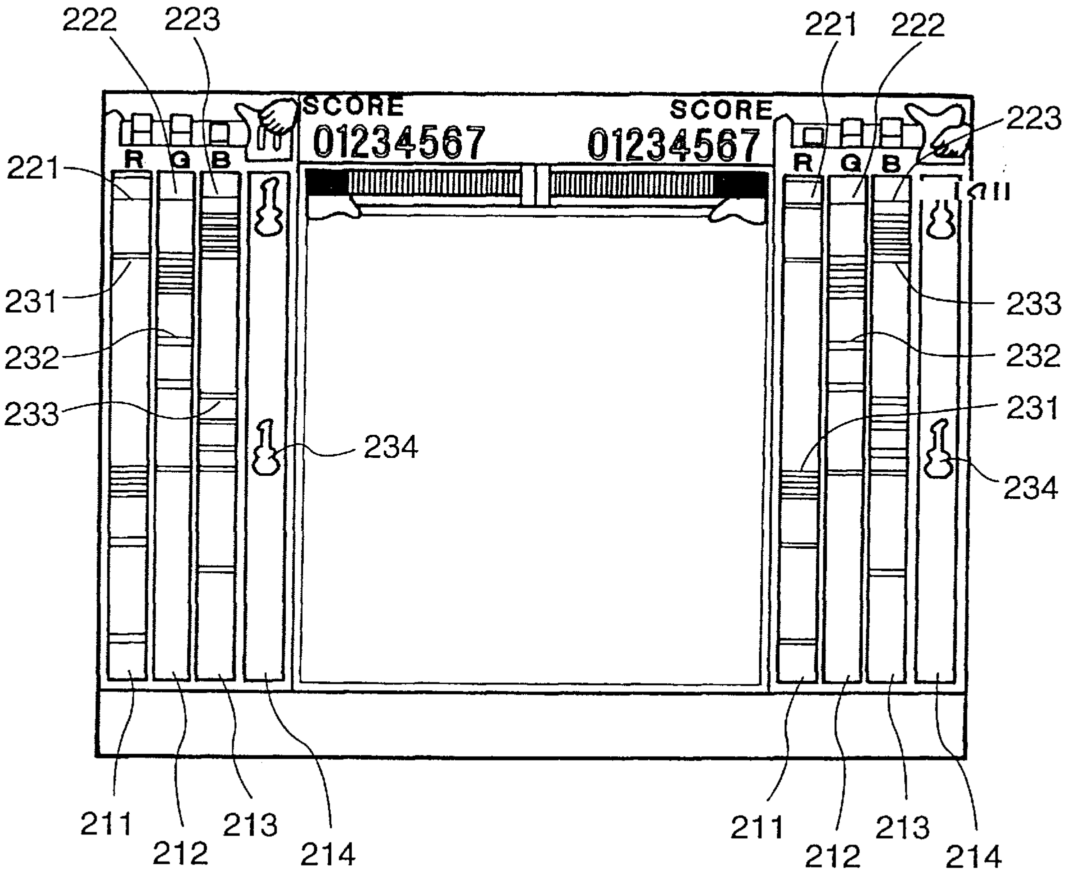
FIG. 4 is a diagram showing an example of an on-screen display on a monitor of a simulated guitar machine.

An allocated data memory 204 stores the individual accompanying sounds allocated from the simulative instrument MIDI data by the allocation processor 203 in relation to allocation information. A picture memory 205 stores a background picture and a guidance picture for aiding in the choice of music pieces to be presented on the monitor 21, as well as individual on-screen display elements which constitute a scrolling notes display for song accompaniment guidance as shown in FIG. 4. A picture processor 206 reads out necessary picture elements from the picture memory 205, produces on-screen picture data in a random-access memory (RAM), for instance, and repeatedly reads out this on-screen picture data to present an on-screen picture on the monitor 21. The picture processor 206 also performs an image processing operation for presenting the scrolling notes display as will be described in detail with reference to FIG. 4.

FIG. 4 is a diagram showing an example of an on-screen display on the monitor 21. Referring to FIG. 4, an appropriate background picture (not illustrated), which may either be a still picture or a moving picture, is displayed in a central part of a screen of the monitor 21, and the notes display is presented as accompaniment guidance on left and right sides of the background picture. Presented at an upper part of the screen is a horizontal barlike scale indicating the degree of properness of the player's performance with respect to the accompaniment guidance. Specifically, the lengths of two black bars on the horizontal scale in FIG. 4 indicate the degrees of properness of the individual players.

The notes display is formed of two sets of vertical scroll bars 211–213 which correspond, respectively, to the three neck buttons 251–253 on the left and right sides reference marks 221–223 which indicate reference (picking timing) lines shown at upper scroll end points of the respective scroll bars 211–213, note marks 231–233 which are scrolled upward at a specific speed from bottom ends of the respective scroll bars 211–213, and a frame of the notes display. While two sets of the scroll bars 211–213 are shown for the two-player performance mode in FIG. 4, only one set of the scroll bars 211–213 is shown in the one-player performance mode. The note marks 231–233 indicate the timing of individual accompanying sounds to be produced in the simulative instrument MIDI data. As previously mentioned, this operating timing is obtained from the timing data contained the simulative instrument MIDI data. The note marks 231–233 indicating the obtained operating timing are allocated to the respective scroll bars 211–213 by the allocation processor 203 and presented on the notes display. Scrolling display of the note marks 231–233 is accomplished by sequentially reading out data in the allocated data memory 204 into the picture processor 206 at specific intervals based on the timing data and updating contents of an internal video RAM of the picture processor 206 with sequentially entered mark image data according to the allocation pattern.

A sound processor (synthesizer) 207 generates an audio signal of a specific waveform from the simulative instrument MIDI data sequentially read out from the allocated data memory 204 and the tone waveforms output from the guitar MIDI data memory 202, and outputs the audio signal to the speakers 26.

The push-button switches S1–S3 of the neck buttons 251–253 and the rocking switch S4 of the picking operation device 254 are connected to the CPU 201, so that the sensing signals indicating that these switches S1–S4 are operated are entered to the CPU 201.

The CPU 201 incorporates a deviation measuring device 2011 which measures the amount of deviation between a point in time each of the note marks 231–233 reaches relevant one of the reference marks 221–223 and a point in time the player watching the accompaniment guidance actually operates the picking operation device 254 using a timer 208, an evaluation device 2012 for evaluating overall performance of each player, a degree-of-properness display device 2013 for indicating the degree of properness in bar-graph form on the horizontal scale substantially in real time based on the amount of deviation and other pieces of information, and a mode switcher 2014.

A specific time period, or time slot, is set for each of the note marks 231–233 to make it possible to determine whether each picking action of the picking operation device 254 belongs to a particular note mark. For example, this time slot may be set to half the time interval between adjacent note marks, or the time interval to a succeeding note mark in the scroll direction of the note marks 231–233 including those on any other scroll bar 211, 212 or 213. If the picking operation device 254 is operated, or picked, within the time slot, it is judged that the picking action is made in response to a note mark closest to the reference mark 221, 222 or 223. The CPU 201 judges that the picking action is made with respect to the note mark closest to the reference mark 221, 222 or 223, and recognizes the scroll bar (211, 212 or 213) on which the relevant note mark exists. On the other hand, when the rocking switch S4 is ON, the CPU 201 determines which one of the neck buttons 251–253 is selected, or operated, based on ON/OFF states of the push-button switches S1–S3. Then, if the selection of the neck button (251, 252 or 253) is correct, as indicated by the scroll bar (211, 212 or 213) on which the aforementioned note mark exists, the sound processor 207 outputs a corresponding audio signal. If, however, the selection of the neck button (251, 252 or 253) is incorrect, the sound processor 207 does not output any audio signal in response to the pertinent picking action. A minimum permissible time period which is set as criteria for determining whether or not to output the audio signal for evaluating the player's performance may be more stringent than the aforementioned time slot. For example, the minimum permissible time period may be a fixed small time period. The sound processor 207 may be so programmed as to output a predefined appropriate audio signal if the picking action is made within the aforementioned time slot but the selection of the neck button (251, 252 or 253) is incorrect. This will help prevent sound dropouts as much as possible.

The evaluation device 2012 assigns a grade to each individual accompanying sound according to the amount of deviation in time of the picking action, wherein the smaller the amount of deviation, the higher the grade. The performance of each player is evaluated based on a score obtained by adding together such grades assigned to all the accompanying sounds. The degree-of-properness display device 2013 keeps continuous watch on the player's performance to evaluate its properness. For the purpose of judging this continuous properness, even more stringent time period may be set. If the player's performance is continuously proper, the degree-of-properness display device 2013 a bar on the horizontal scale indicating the degree of properness becomes longer, and vice versa. If the bar on the horizontal scale is minimized (e.g., zeroed), the player is judged incompetent as an accompanist and the performance is forcibly terminated. In this case, the CPU 201 transmits a forced-end signal to the CPU 101. When the forced-end signal is received, the CPU 101 also forcibly terminates operation of the karaoke machine 1 related to instrumental accompaniment.

The mode switcher 2014 selectively switches the song accompaniment system between karaoke mode in which full accompanying music is delivered to the speakers 13 of the karaoke machine 1 and simulated guitar accompaniment mode in which accompanying music obtained by eliminating the simulative instrument MIDI data from the full accompanying music is delivered to the speakers 13. When either of the simulated guitars 25 is used, the CPU 201 transmits a simulated guitar accompaniment mode signal to the CPU 101. The CPU 101 controls the system such that accompanying music appropriate for the current mode is delivered to the speakers 13 depending on whether the simulated guitar accompaniment mode signal is received.

A judgment as to whether the system is operated in the karaoke mode or in the simulated guitar accompaniment mode is made as follows, for instance. If a music piece to be performed is selected on the karaoke machine 1, it is judged that the karaoke mode is selected, and if a music piece to be performed is selected on the simulated guitar machine 2, it is judged that the simulated guitar accompaniment mode is selected. In the latter case, the aforementioned simulated guitar accompaniment mode signal is transmitted.

Operation of the song accompaniment system is now described with reference to FIGS. 5 and 6.

Figure 5:
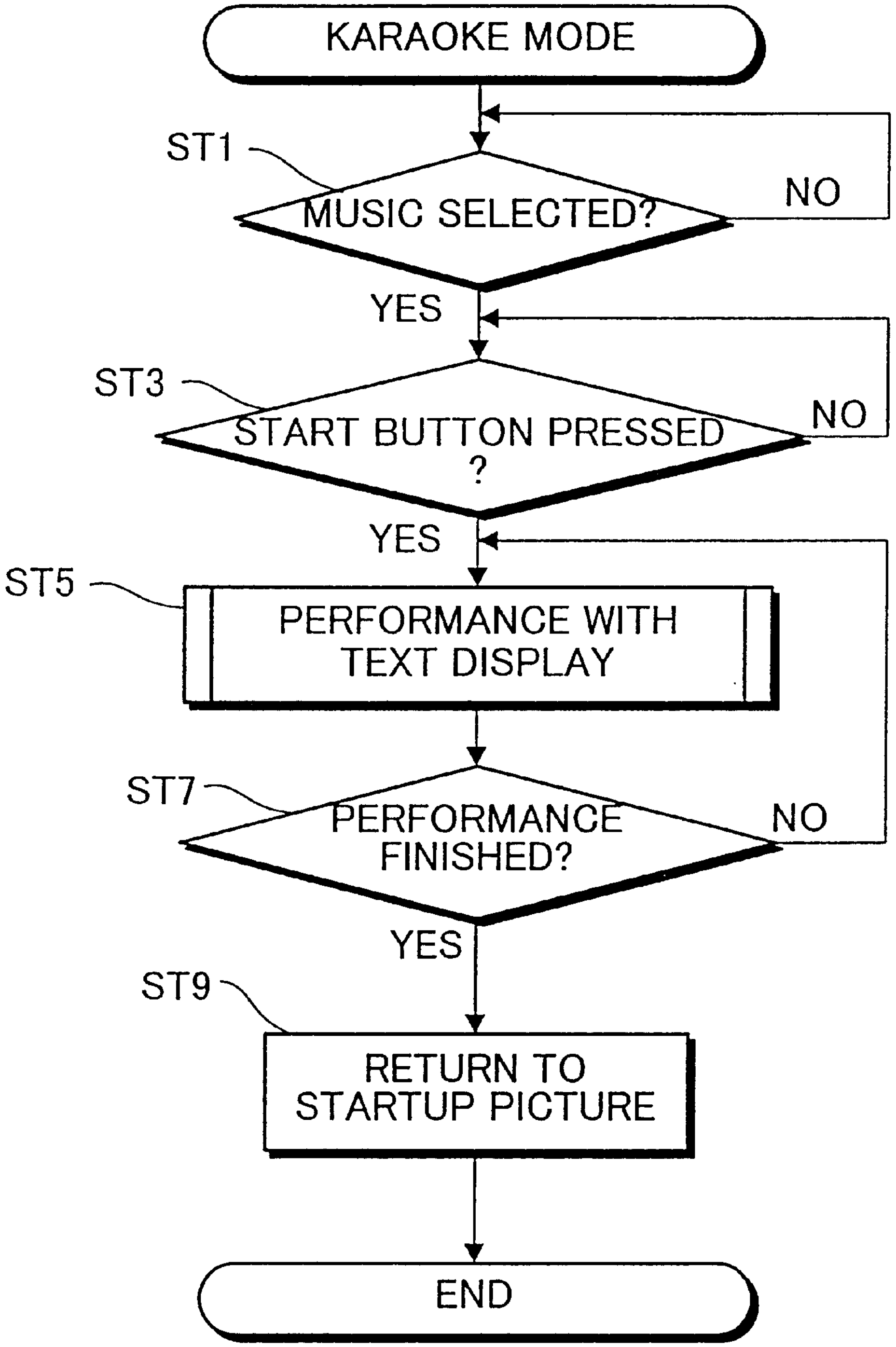
FIG. 5 is a flowchart showing an operation flow for executing karaoke mode.

FIG. 5 is a flowchart showing an operation flow for executing the karaoke mode. Since the simulated guitar machine 2 does not operate in the karaoke mode, the CPU 101 of the karaoke machine 1 carries out a prescribed operating procedure. When a music number is entered through the music select buttons 121 of the operating panel 12 (step ST1), music data and song text data for the specified music number are located in the MIDI data memory 103 and the text data memory 104, respectively. Then, when the start button 122 is pressed (step ST3), the pertinent MIDI data is sequentially read out with the lapse of time and output to the speakers 13 through the MIDI sound source memory 102 and the sound processor 107, and with the progress of performance, the song text is displayed one measure after another on the monitor 11 through the picture processor 109 (step ST5). When the performance of one music piece is completed (step ST7), the picture processor 109 switches on-screen display of the monitor 11 to a demonstration picture to a startup picture waiting for selection of a next music piece, for example (step ST9).

Figure 6:
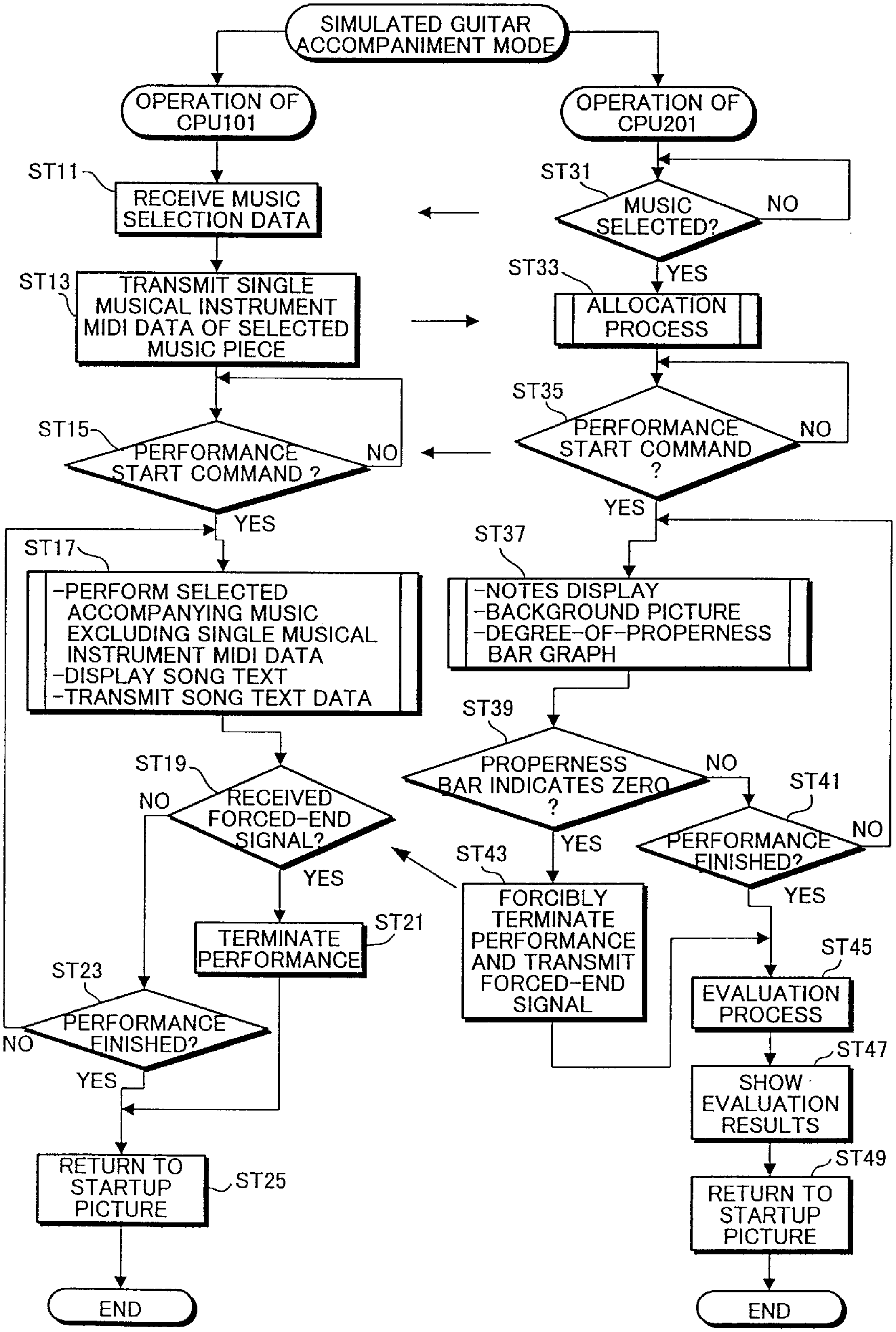
FIG. 6 is a flowchart showing an operation flow for executing simulated guitar accompaniment mode.

FIG. 6 is a flowchart showing an operation flow for executing the simulated guitar accompaniment mode, in which both the CPU 101 and the CPU 201 carry out their own operating procedures.

When a desired music piece is selected through the operating panel 22 (step ST31), music selection data is transmitted from the CPU 201 to the CPU 101 (step ST11). Upon receiving the music selection data, the CPU 101 transmits simulative instrument MIDI data of the music piece selected to the simulated guitar controller 200 (step ST13). When the simulative instrument MIDI data is received, the allocation processor 203 of the simulated guitar controller 200 allocates the MIDI data to the three scroll bars 211–213 according to the relevant allocation pattern (step ST33) and memorizes allocation data content. When a performance start command is entered upon completion of this allocation process (step ST35), a performance start signal is transmitted to the karaoke controller 100.

Upon receiving the music selection data, the CPU 101 transmits data obtained by eliminating the simulative instrument MIDI data from the full MIDI data of the music piece selected to the sound processor 107 through the MIDI sound source memory 102. This data is modulated into a specific audio signal, which is then output through the speakers 13. In synchronism with this sound generation process, the song text data of the selected music piece is read out to display the song text one measure after another on the monitor 11 through the picture processor 109 and, where necessary, the song text data is transmitted also to the simulated guitar controller 200 (step ST17).

In the simulated guitar controller 200, on the other hand, the monitor 21 is caused to present the notes display using the timing data to enable the players to produce the accompanying sounds in synchronism with the guidance picture, as well as the background picture and the black bars on the horizontal scale indicating the degree of properness of each player's performance (step ST37). The notes display is the accompaniment guidance which enables the players to predictably select the correct neck buttons 251–253 of the simulated guitars 25 and operate their picking operation devices 254 with correct timing.

While the guidance picture is presented, a judgment is made to determine whether either of the black bars on the horizontal scale indicating the degree of properness of each player's performance indicates zero value (step ST39). If neither of the black bars indicates zero value, a further judgment is made to determine whether the performance of the selected music piece is completed (step ST41). On the other hand, either of the black bars indicates zero value during the performance of the selected music piece, the pertinent player is judged incompetent to play accompanying music with the simulated guitar 25, and the CPU 201 issues a command to forcibly terminate the performance of the selected music piece and transmits a forced-end signal to the karaoke controller 100 (step ST43).

When the performance of the accompanying music is completed or forcibly terminated, an evaluation process is performed to evaluate the performance of the accompanying music with the simulated guitars 25 (step ST45). After the monitor 21 presents results of evaluation (step ST45), on-screen display of the monitor 21 is switched to its startup picture (step ST47).

On the other hand, the CPU 101 of the karaoke controller 100 judges whether the forced-end signal is received from the simulated guitar controller 200 (step ST19). When the forced-end signal is received, the CPU 101 immediately terminates the instrumental accompaniment operation and presentation on the monitor 11 (step ST21) and causes the picture processor 109 to switch the on-screen display of the monitor 11 to its startup picture (step ST25). If the performance of the accompanying music is completed without being terminated halfway (step ST23), the on-screen display of the monitor 11 is returned to the startup picture (step ST25).

While the invention has so far been described with reference to its preferred embodiment, many modifications and variations can be made thereto. Some of these modifications and variations are cited in the following.

(1) Although the above-described song accompaniment system of the preferred embodiment is constructed mainly of two separate consoles, or the karaoke machine 1 and the simulated guitar machine 2, these machines may be incorporated in a common console. In this single-console configuration, the speakers 13, 26 and the monitors 11, 21 which are individually may be shared by the two machines 1, 2, and this will help achieve reduction in overall physical size, system simplification and cost reduction. The CPUs 101 and 201 may also be combined into a single CPU.

(2) Although the MIDI data and the simulative instrument MIDI data are stored in the separate memories 103, 105 in the karaoke machine 1 in the foregoing embodiment, circuit configuration or software may be modified to require only a single memory which stores the MIDI data of accompanying music. To achieve this, the circuit configuration or software should be modified such that portions of the MIDI data stored in the single memory can be separately read out. More specifically, the MIDI data should be read out and replayed in its entirety during playback in the karaoke mode, while a portion of the MIDI data excluding the simulative instrument MIDI data for guitar should be read out and replayed with a capability to separately output the simulative instrument MIDI data in the simulated guitar accompaniment mode. Alternatively, depending on the method of transmitting data from the source data storage 3, a MIDI data storage may be configured such that it can separately store the simulative instrument MIDI data and that portion of the MIDI data of accompanying music excluding the simulative instrument MIDI data beforehand.

(3) Although the accompanying music is stored in the form of the MIDI data in the preferred embodiment described heretofore, the invention is not limited thereto but may be modified to use audio waveform data stored in digital form on a compact disc read-only memory (CD-ROM), for example.

(4) Although allocation of the simulative instrument MIDI data is made by the simulated guitar controller 200 before the performance of the accompanying music is started in the foregoing embodiment, it may be modified such that accompanying sound data already allocated to the three neck buttons 251–253 are downloaded from the source data storage 3. This variation of the above-described embodiment would help simplify the configuration of the simulated guitar controller 200. When the karaoke mode is selected in this variation, information on the allocation of the accompanying sound data contained in music data is to be left unused.

(5) The song text need not necessarily be displayed on the monitor 21 of the simulated guitar machine 2. A select button, for instance, may be provided on the karaoke machine 1 or on the simulated guitar machine 2 to make it possible to choose whether or not to display the song text on the monitor 21. One advantage of displaying the song text on the monitor 21 is that it would enable the player at the simulated guitar machine 2 to sing to his or her own guitar accompaniment.

(6) Presentation of the notes display is not limited to vertical format using the vertical scroll bars 211–213 as shown in FIG. 4. The notes display may be presented in horizontal format instead of the vertical format. Also, instead of scrolling groups of the note marks 231–233 on the scroll bars 211–213, the reference marks 221–223 (or timing marks) may be moved along the respective scroll bars 211–213 relative to the note marks 231–233 which are held stationary on the scroll bars 211–213. Whichever presentation method is used, what is essential for the notes display is that the note marks 231–233 should be moved relative to the respective reference marks 221–223 to enable the players to predict operating timing.

(7) The number of scroll bars need not necessarily match the number of the neck buttons 251–253 of each simulated guitar 25. As an example, note marks for the three neck buttons 251–253 may be presented on a single scroll bar in a manner that allows the player to recognize the note marks allocated to the individual neck buttons 251–253 by different colors. In one alternative, the note marks allocated to the individual neck buttons 251–253 may be made distinguishable from one another by different mark shapes or by neck button numbers affixed to the note marks. In another alternative, each simulated guitar may have six neck buttons. In this alternative, note marks for the individual neck buttons may be presented on a single scroll bar or on two scroll bars, each showing the note marks allocated to three neck buttons. The number of the scroll bars can be reduced in this fashion to satisfactorily present a guidance picture even when the screen area is limited, or to allow for additional presentation of other effective or attractive images.

(8) Although the above-described embodiment uses the simulative instrument MIDI data and accompanying music MIDI data excluding the simulative instrument MIDI data, substantially the same data can be obtained if the simulative instrument MIDI data is made available in addition to the accompanying music MIDI data excluding the simulative instrument MIDI data.

(9) The karaoke machine 1 is provided with the simulative instrument MIDI data memory 105 while the simulated guitar machine 2 is provided with the two simulated guitars 25 as shown in FIG. 1 in the foregoing embodiment. This configuration enables two players to play together the same accompanying music with the respective simulated guitars 25. If the simulated guitars 25 are of different types, their music data are to be stored with two different musical instrument numbers in the simulative instrument MIDI data memory 105 and the simulated guitar machine 2 should provide different song accompaniment guidances for the respective simulated guitars 25.

(10) The number of neck buttons is not limited to three, but each simulated guitar may be provided with a desired number of neck buttons. In one alternative, the neck buttons 251–253 may be completely eliminated if it is desired to simulate easy-to-operate guitars which can be played only with their picking operation devices. In this alternative, only one kind of note marks should be presented on a single scroll bar for each simulated guitar.

(11) Although the invention has been described with reference to its specific embodiment employing the simulated guitars 25, the invention is also applicable to a system employing other musical instruments. For example, the invention is applicable to a system employing other types of string instruments, keyboard instruments, wind instruments, percussion instruments, hand-held musical instruments, such as tambourines, maracas or castanets, or a combination thereof. If it is made possible to selectively output MIDI data for one or more specified types of musical instruments, the system may be provided with multiple types of musical instruments.

(12) While the judgment on the selection of the karaoke mode or the simulated guitar accompaniment mode is made depending on whether a music piece to be performed is selected on the karaoke machine 1 or the simulated guitar machine 2 in the foregoing embodiment, this judgment may be made by various other methods. One simple example of such alternative methods is to provided a mode select button which allows the player to select the desired mode.

(13) In addition to the music pieces for the karaoke machine 1, a specific number of music pieces dedicated to performance by the simulated guitar machine 2 may be stored therein. In this alternative, there may be provided a selector which enables the player to choose whether the player should play part of accompanying music or one of the dedicated music pieces.

(14) Although the song accompaniment system of the foregoing embodiment is coin-operated like those installed in an amusement facility, the system may be modified such that its operable time is determined by a preset number of music pieces to be performed or by a preset time duration.

(15) Furthermore, although the degree of properness of the player's performance is indicated in bar-graph form only on the simulated guitar machine 2 in the foregoing embodiment, a similar bar-graph display indicating the singing ability of a singer may be presented on a scale at an appropriate location on the screen of the monitor 11 of the karaoke machine 1. In this variation, the singing ability aided by the karaoke machine 1 is evaluated based on synchronism of sounds pronounced with accompanying music, the frequency and loudness of the individual sounds using technology of the prior art. Evaluation values are integrated with the progress of performance, and a resultant integrated value representing the singing ability of the singer at the karaoke machine 1 is presented in bar-graph form. When the degree of properness of the player's performance at the simulated guitar machine 2 becomes equal to zero, operation of the song accompaniment system is brought to a forced end in the foregoing preferred embodiment. When the aforementioned variation is employed, however, the song accompaniment system may be controlled such that it is not brought to a forced end if the value representing the singing ability of the singer at the karaoke machine 1 or the degree of properness of the player's performance at the simulated guitar machine 2 is not equal to zero. More specifically, if the degree of properness of the player's performance at the simulated guitar machine 2 is not equal to zero when the integrated value representing the singing ability of the singer at the karaoke machine 1 is a negative score due to a mistake in singing, the value indicating the degree of properness of the player's performance at the simulated guitar machine 2 is used to cancel out the negative score so that the operation of the song accompaniment system is not forcibly terminated.

An inclination sensor S5 may be provided inside each simulated guitar 25 to sense that it is set in an upright position with guitar marks 224 (indicating that the relevant simulated guitar 25 is in its upright position) scrollably shown on left and right scroll bars 214 within the notes display as shown in FIG. 4. In this case, if the value indicating the degree of properness of the player's performance is increased when the relevant simulated guitar 25 is set in its upright position, the song accompaniment system can be made more attractive with respect to its forced termination.

As described above, an inventive song accompaniment system comprises a singing support apparatus including a first sound output device which outputs accompanying music played by a plurality of musical instruments with a capability to mix and output vocal sounds entered from a microphone with the accompanying music, and an instrumental accompaniment apparatus including a simulative instrument having a timing indicating operation device, a first monitor which presents on-screen guidance indicating operating timing of the simulative instrument for playing a simulative instrument part of the accompanying music selectively taken in from the singing support apparatus, and a second sound output device which outputs sounds of the simulative instrument part when the instrumental accompaniment apparatus senses that the timing indicating operation device is operated in accordance with the on-screen guidance. The singing support apparatus stores the simulative instrument part of the accompanying music and remaining part of the accompanying music, and delivers the accompanying music excluding the simulative instrument part to the first sound output device.

In this construction, the accompanying music is output from the first sound output device in the singing support apparatus so that a singer can sing a song using the microphone while listening to the accompanying music. Since song text can be displayed on a second monitor in synchronism with the progress of performance of the accompanying music, the singer can sing even if he or she does not know the song text.

The instrumental accompaniment apparatus, on the other hand, takes in the simulative instrument part of the accompanying music to be played by the simulative instrument and the operating timing of the simulative instrument for playing the simulative instrument part is presented as the on-screen guidance on the first monitor. If a player correctly operates the timing indicating operation device of the simulative instrument in accordance with the on-screen guidance, the instrumental accompaniment apparatus detects operation signals and causes the second sound output device to output corresponding sounds of the simulative instrument part of the accompanying music. If the player fails to operate the timing indicating operation device with correct timing, no sound is output, for example. If the player correctly operates the timing indicating operation device according to the on-screen guidance, the simulative instrument part of the accompanying music is reproduced properly. Contrary to this, if the player operates the timing indicating operation device incorrectly, corresponding sounds will not be produced. Alternatively, the sounds may be produced with incorrect timing when the timing indicating operation device is operated with improper timing. In either case, the full accompanying music is output from the first and second sound output devices together when the timing indicating operation device is operated with proper timing.

It may be appreciated to use only the first or the second sound output device to produce the full accompanying music. In another variation, if multiple simulative instruments or multiple types of simulative instruments are provided at the instrumental accompaniment apparatus, the on-screen guidance on the first monitor may include note marks for the individual simulative instruments so that each player can play their own a simulative instrument part with correct timing. For example, if there are provided two simulative instruments, the on-screen guidance may be displayed at left and right sides of the first monitor for the individual players. In this multiple musical instrument configuration, sounds produced by the individual simulative instruments may be separately output to the second sound output device.

In the inventive song accompaniment system, the singing support apparatus and the instrumental accompaniment apparatus are systematically combined with each other. Accordingly, a particular instrument part of the accompanying music can be played by the instrumental accompaniment apparatus, thereby providing more sophisticated music play game.

The instrumental accompaniment apparatus may further include a plurality of selective operating parts which can be operated selectively, an allocation processor which takes in the simulative instrument part of the accompanying music and allocates the individual sounds of the simulative instrument part to the selective operating parts, a first display controller which presents note marks representative of the individual sounds allocated along a direction of performing the accompanying music on the first monitor in a manner that allows recognition of allocation of the individual sounds with respect to the selective operating parts, while causing the note marks to scroll relative to timing marks which indicate the timing of operating the timing indicating operation device, and a sound controller which causes the second sound output device to output a sound corresponding to a note mark if its corresponding selective operating part and the timing indicating operation device are operated together when the note mark matches up with its corresponding timing mark.

In this construction, when the simulative instrument part is read from the singing support apparatus into the instrumental accompaniment apparatus prior to the start of performance after a music piece is selected, for instance, the sounds of the simulative instrument part are allocated to the individual selective operating parts by the allocation processor. This construction makes it possible to automatically allocate the individual sounds to the selective operating parts, so that complicated manual allocation can be eliminated. Allocation process may be performed by using a specific allocation pattern. It would be possible to prepare a plurality of allocation patterns and the individual sounds may be sequentially allocated using one or more allocation patterns according to a prescribed rule. Allocation patterns with varying difficulties of performance may be prepared, making it possible to use allocation patterns with increasing levels of difficulty at climatic part of music to create variations in its performance. This approach would help improve the player's skill, making it possible to play the simulative instrument part of a particular accompanying music in a consistent fashion with practice and experience. In another alternative approach, different allocation patterns may be selected at random.

The individual sounds allocated are represented by the note marks on the first monitor in a manner that the relationship between the note marks and the selective operating parts is easily recognized. The note marks are arranged along the direction of performing the accompanying music and scrolled relative to the timing marks indicating the timing of operating the timing indicating operation device. It is preferable that the note marks be scrolled because prediction of the operating timing is not interrupted. If the selective operating part corresponding to a particular timing mark is operated, or if the selective operating part and the timing indicating operation device are operated together when a note mark matches up with its corresponding timing mark, the sound corresponding to the note mark is output through the second sound output device.

The singing support apparatus may further include a data memory, and a memory controller which receives the accompanying music and the simulative instrument part together with music title and song text from a source data storage via a communications line and causes the data memory to store the accompanying music, the simulative instrument part, the music title and the song text in a manner that they can be read out from the data memory.

In this construction, only if music data including the full accompanying music, the simulative instrument part, music titles (music numbers) and song texts are stored in the source data storage serving as a server, it become possible to read the music data of a number of music pieces into data memories of multiple song accompaniment systems installed at different sites by downloading from the source data storage when the need arises, and it becomes unnecessary to visit the installation sites of the individual song accompaniment systems for loading new music data. Since the music data is produced and stored in the source data storage at a single site, the music pieces can be increased or updated much promptly.

The singing support apparatus may be capable of selectively executing karaoke mode in which the accompanying music is delivered to the first sound output device and simulative instrument accompaniment mode in which the accompanying music excluding the simulative instrument part is delivered to the first sound output device, and the singing support apparatus executes the simulative instrument accompaniment mode upon receiving a mode signal which is output when the instrumental accompaniment apparatus is activated. The applicability of the song accompaniment system can be expanded since the karaoke mode and the simulative instrument accompaniment mode can be selected whenever desired.

The instrumental accompaniment apparatus may take in song text of the music to be performed and present it on the first monitor. The player at the instrumental accompaniment apparatus can sing a song while playing the simulative instrument since the song text is displayed on the first monitor along with the operating timing of the simulative instrument.

This application is based on patent application No. 11-250903 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A song accompaniment system comprising:

a singing support apparatus including a first sound output device which outputs accompanying music played by a plurality of musical instruments with a capability to mix and output vocal sounds entered from a microphone with the accompanying music; and an instrumental accompaniment apparatus including a simulative instrument having a timing indicating operation device, a first monitor which presents on-screen guidance indicating operating timing of the simulative instrument for playing a simulative instrument part of the accompanying music selectively taken in from the singing support apparatus, and a second sound output device which outputs sounds of the simulative instrument part when the instrumental accompaniment apparatus senses that the timing indicating operation device is operated in accordance with the on-screen guidance;

wherein the singing support apparatus stores the simulative instrument part of the accompanying music and remaining part of the accompanying music, and delivers the accompanying music excluding the simulative instrument part to the first sound output device.

2. A song accompaniment system according to claim 1, wherein the singing support apparatus further includes:

a second monitor; and a second display controller which presents song text of the music to be performed on the second monitor in synchronism with the progress of performance of the accompanying music.

3. A song accompaniment system according to claim 1, wherein the singing support apparatus further includes:

a data memory; and a memory controller which receives the accompanying music and the simulative instrument part together with music title and song text from a source data storage via a communications line and causes the data memory to store the accompanying music, the simulative instrument part, the music title and the song text in a manner that they can be read out from the data memory.

4. A song accompaniment system according to claim 1, wherein the singing support apparatus is capable of selectively executing karaoke mode in which the accompanying music is delivered to the first sound output device and simulative instrument accompaniment mode in which the accompanying music excluding the simulative instrument part is delivered to the first sound output device, and the singing support apparatus executes the simulative instrument accompaniment mode upon receiving a mode signal which is output when the instrumental accompaniment apparatus is activated.

5. A song accompaniment system according to claim 1, wherein the instrumental accompaniment apparatus further includes:

a plurality of selective operating parts which are selectively operable;

an allocation processor which takes in the simulative instrument part of the accompanying music and allocates the individual sounds of the simulative instrument part to the selective operating parts;

a first display controller which presents note marks representative of the individual sounds allocated along a direction of performing the accompanying music on the first monitor in a manner that allows recognition of allocation of the individual sounds with respect to the selective operating parts, while causing the note marks to scroll relative to timing marks which indicate the timing of operating the timing indicating operation device; and a sound controller which causes the second sound output device to output a sound corresponding to a note mark if its corresponding selective operating part and the timing indicating operation device are operated together when the note mark matches up with its corresponding timing mark.

6. A song accompaniment system according to claim 5, wherein the singing support apparatus further includes:

a data memory; and a memory controller which receives the accompanying music and the simulative instrument part together with music title and song text from a source data storage via a communications line and causes the data memory to store the accompanying music, the simulative instrument part, the music title and the song text in a manner that they can be read out from the data memory.

7. A song accompaniment system according to claim 5, wherein the singing support apparatus is capable of selectively executing karaoke mode in which the accompanying music is delivered to the first sound output device and simulative instrument accompaniment mode in which the accompanying music excluding the simulative instrument part is delivered to the first sound output device, and the singing support apparatus executes the simulative instrument accompaniment mode upon receiving a mode signal which is output when the instrumental accompaniment apparatus is activated.

8. A song accompaniment system according to claim 7, wherein the instrumental accompaniment apparatus takes in song text of the music to be performed and presents it on the first monitor.

9. A song accompaniment system according to claim 5, wherein the singing support apparatus further includes:

a second monitor; and a second display controller which presents song text of the music to be performed on the second monitor in synchronism with the progress of performance of the accompanying music.

10. A song accompaniment system according to claim 9, wherein the instrumental accompaniment apparatus takes in song text of the music to be performed and presents it on the first monitor.

11. A song accompaniment system according to claim 9, wherein the singing support apparatus further includes:

a data memory; and a memory controller which receives the accompanying music and the simulative instrument part together with music title and song text from a source data storage via a communications line and causes the data memory to store the accompanying music, the simulative instrument part, the music title and the song text in a manner that they can be read out from the data memory.

12. A song accompaniment system according to claim 11, wherein the instrumental accompaniment apparatus takes in song text of the music to be performed and presents it on the first monitor.

13. A song accompaniment system according to claim 11, wherein the singing support apparatus is capable of selectively executing karaoke mode in which the accompanying music is delivered to the first sound output device and simulative instrument accompaniment mode in which the accompanying music excluding the simulative instrument part is delivered to the first sound output device, and the singing support apparatus executes the simulative instrument accompaniment mode upon receiving a mode signal which is output when the instrumental accompaniment apparatus is activated.

14. A song accompaniment system according to claim 13, wherein the instrumental accompaniment apparatus takes in song text of the music to be performed and presents it on the first monitor.

15. A song accompaniment system according to claim 9, wherein the singing support apparatus is capable of selectively executing karaoke mode in which the accompanying music is delivered to the first sound output device and simulative instrument accompaniment mode in which the accompanying music excluding the simulative instrument part is delivered to the first sound output device, and the singing support apparatus executes the simulative instrument accompaniment mode upon receiving a mode signal which is output when the instrumental accompaniment apparatus is activated.

16. A song accompaniment system according to claim 15, wherein the instrumental accompaniment apparatus takes in song text of the music to be performed and presents it on the first monitor.

17. A song accompaniment system according to claim 9, wherein the instrumental accompaniment apparatus takes in song text of the music to be performed and presents it on the first monitor.

* * * * *